United States Patent [19]

Le Méhauté et al.

[11] Patent Number: 4,495,258

[45] Date of Patent: Jan. 22, 1985

[54] ELECTRODE OF ALKALI METAL COMPOUND FOR A SECONDARY ELECTROCHEMICAL CELL, AND A CELL INCLUDING SUCH AN ELECTRODE

[75] Inventors: Alain Le Méhauté, Gif-sur-Yvette; Claude Belin, Montpellier, both of France

[73] Assignee: Societe Anonyme dite: Compagnie Generale d'Electricite, Paris, France

[21] Appl. No.: 583,186

[22] Filed: Feb. 24, 1984

[30] Foreign Application Priority Data

Feb. 28, 1983 [FR] France ............................... 83 03245

[51] Int. Cl.³ ............................................ H01M 4/36
[52] U.S. Cl. ..................................... 429/103; 429/105; 429/191; 429/194; 429/196; 429/218; 252/182.1
[58] Field of Search ............... 429/101, 103, 105, 194, 429/196, 218, 191; 423/276; 252/182.1

[56] References Cited

U.S. PATENT DOCUMENTS

| | | | |
|---|---|---|---|
| 4,288,508 | 9/1981 | Basu et al. | 429/218 |
| 4,346,152 | 8/1982 | Sammells et al. | 429/218 X |
| 4,376,709 | 3/1983 | Johnson et al. | 429/218 X |

FOREIGN PATENT DOCUMENTS 2442514 6/1980 France.

Primary Examiner—Charles F. Lefevour
Attorney, Agent, or Firm—Kenyon & Kenyon

[57] ABSTRACT

The active material is constituted by an alkali metal in the zero valent state which alkali metal is inserted into an insertion compound. The insertion compound receiving the alkali metal has an ordered three-dimensional lattice structure and is constituted by at least one intermetallic compound having polyatomic anionic clusters with atoms chosen from the group constituted by gallium, boron and aluminum, and with structuring counter ions chosen from the group constituted by alkaline earth and alkali ions.

14 Claims, 4 Drawing Figures

ELECTRODE OF ALKALI METAL COMPOUND FOR A SECONDARY ELECTROCHEMICAL CELL, AND A CELL INCLUDING SUCH AN ELECTRODE

The present invention relates to an electrode for a secondary electrochemical cell for operation in a non-aqueous medium, and to a method of manufacturing the electrode. The invention also relates to cells using such an electrode.

BACKGROUND OF THE INVENTION

In electrochemical cells having a negative electrode made completely or partially of lithium, it is known that the electrode's kinetic stability in the presence of a non-aqueous electrolyte only permits a limited number of charge/discharge cycles.

This limitation results, in particular, from the facts that such electrodes are passivated by reacting with the solvent, and also that they grow dendrites; these two phenomena limiting charging efficiency to such an extent that it rarely exceeds 50%.

Remedies have therefore been sought for these drawbacks, and in particular, for improving cycling characteristics in a non-aqueous electrolytic medium.

As an example of such proposed remedies, M. Garreau, J. Thévénin, D. Warin and P. Campion at the "International Workshop on Lithium Non-Aqueous Batteries, Cleveland 1980", proposed using electrodes made of lithium and of aluminum by electroplating lithium onto an aluminum substrate. By solid phase diffusion, the lithium formed a compound of the $Li_pAl$ type, where p is less than unity. When cycling at ambient temperature, this compound is capable of reversibly releasing lithium during the course of more than one hundred charge-discharge cycles, at current densities which may exceed one $mA/cm^2$, and for cycled capacities of more than 1 $mAh/cm^2$.

Unfortunately, such an electrode has several drawbacks resulting firstly from the increase in molecular volume of such a compound in comparison with lithium, and secondly from an electrode potential which differs by 350 mV from that of lithium, thereby reducing the free energy of the overall system.

Various other proposals have been made along the same lines, and in particular Li-Si and Li-B alloys have been studied as negative electrode materials for cells operating at high temperature.

However, these alloys have phase transitions and too small lithium activity to have any advantage over lithium/aluminum systems which are also much more reversible.

Further, electrode shedding during cycling is observed with the alloys, which reduces their lifetime. This results from the lithium-receiving structure not being organized.

Proposals have also been made to make a negative electrode from the compound $Li_xCaSi_2$, where x lies in the range 0 to 4.

However, in all such alloys the reversibility of the lithium-containing electrode remains low and the activity of the lithium remains well below unity.

French published patent specification No. 2,442,514 also proposes using lithium insertion compounds for making the negative electrode, and more particularly using layer structure compounds based on graphite. Specific examples include $LiC_6$, $KC_8$, etc. In all cases, the insertion compound has a two-dimensional lattice structure in which the lithium is sandwiched or interposed without true insertion. Such compounds have the drawbacks firstly of having a chemical potential which is fairly far removed from that of lithium, and secondly, and above all, of catalyzing decomposition reactions in electrolytes.

Preferred embodiments of the present invention provide an improved lithium-containing negative electrode structure for use in a rechargeable cell having a non-aqueous electrolyte.

SUMMARY OF THE INVENTION

The present invention provides an electrode for a secondary electrochemical cell operating in a non-aqueous medium, wherein the active material is constituted by an alkali metal in the zero valent state which alkali metal is inserted into an insertion compound, the improvement wherein said insertion compound receiving said alkali metal has an ordered three-dimensional lattice structure and is constituted by at least one intermetallic compound having polyatomic anionic clusters with atoms chosen from the group constituted by gallium, boron and aluminum, and with structuring counter ions chosen from the group constituted by alkaline earth and alkali ions.

The present invention also provides a method of manufacturing such an electrode, and a secondary electrochemical cell including such an electrode.

An electrode in accordance with the invention thus includes the compound of formula $A_zM_yG$, in which: A is an alkali metal constituting the active material of the electrode, and is generally lithium; M is a structural alkali metal or an alkaline earth; and G is chosen from gallium, boron and aluminum; where preferably $$0 \leq z \leq 6$$

$$0.05 \leq y \leq 2$$

In general, M and A are different, but the invention is also applicable when they are identical.

When G is gallium, M is advantageously chosen from Li, Na and K.

By way of example, materials represented by the following formulae are mentioned as being structured homopolyatomic anionic clusters suitable for receiving lithium:

$K_{0.23}Ga$, $Li_{0.21}Ga$, $Li_2Ga$, $Na_{0.25}Ga$, $Li_{1.5}Ga$, $Li_{1.25}Ga$, $Na_{0.56}Ga$.

The anionic cluster compound may be heteropolyatomic. Thus it may simultaneously include boron and gallium, or aluminum and gallium. Further, the structural ions may include a mixture of alkali ions and alkaline earth ions.

An insertion compound having an ordered three-dimensional lattice and usable in accordance with the invention to make an electrode for a secondary electrochemical cell avoids the drawbacks of prior art alloys and two-dimensional lattice interposition compounds.

Since the alkali metal is held in place inside an ordered or structured three-dimensional lattice, electrode shedding is avoided during cycling operations, unlike alloys in which the lattice is disorganized. Further, and again unlike alloys, exchange reaction polarization is not observed, which polarization would cause the electrodes to become irreversible and would thus lead to energy loss in use.

Furthermore, the compounds usable in accordance with the present invention have chemical potentials which are closer to those of alkali metals than are the potentials of the known two-dimensional structure interposition compounds based on graphite. This increases the energy which can be stored.

Improved electrolyte stability is also observed with compounds usable in accordance with the invention.

Finally, in comparison with electrodes using compounds having a two-dimensional interposition layer structure, it is observed that electrodes in accordance with the invention have improved reversibility since the transport of alkali metal in the zero-valent state within a three-dimensional structure in accordance with the invention is enhanced because it is subjected to electric field gradients resulting from the presence of structural alkali or alkaline earth counter ions, whereas in graphite layer structures transport takes place without any field effect because of the inert nature of the receiving structure.

BRIEF DESCRIPTION OF THE DRAWINGS

Embodiments of the invention are described by way of example with reference to the accompanying drawings, in which.

MORE DETAILED DESCRIPTION

An example of an electrochemical cell in accordance with the invention comprises the following components:

NEGATIVE ELECTRODE

The negative electrode is made from the compound $K_{0.23}Ga$ having a homopolyatomic anionic cluster structure in which gallium constitutes the base element.

The structure of such a compound is described, in particular, in the article "The structure determination of a new intermetallic compound $K_3Ga_{13}$" by C. Belin in the journal Acta Crystallographica (1980) B 36 1339–1343.

The $K_{0.23}Ga$ (ie. $K_3Ga_{13}$) phase is characterized by the fact that two types of cluster are observed therein (icosahedric and and octadecahedric) interconnected by direct bonds and via isolated gallium atoms. The potassium atoms occupy channels that lie parallel to the b axis of the crystal.

Such a compound has lithium insertion properties suitable for producing $Li_xK_{0.23}Ga$, where $0 \leq x \leq 6$.

The compound may thus constitute the negative electrode of an electrochemical cell.

The compound $K_{0.23}Ga$ may be reduced in the presence of lithium to provide the active material $Li_xK_{0.23}Ga$ by electrochemical means in a stable polar solvent, such as dioxolane, 2-methyl tetrahydrofuran, tetrafurfuryl ether, a molten salt, or a solid solvent such as polyoxyethylene.

It is also possible to use chemical reduction with insertion of zero valent lithium by means of a solution of lithium in liquid ammonia.

POSITIVE ELECTRODE

The positive electrode may comprise: a compound such as $Li_zFeS_2$, $Li_zNiPS_3$, or $Li_zTiS_2$, where $0 < z < 4$; a compound such as $Li_yMnO_2$ where $y \leq 1$; or sulfur, polysulfides, $SO_2$, or $SOCl_2$.

ELECTROLYTE

The electrolyte advantageously comprises dioxolane including lithium perchlorate $ClO_4Li$ in solution, but it may alternatively comprise a molten salt such as a mixture of alkaline chlorides, eg. LiCl-KCl, or a solid solvent such as polyoxyethylene in which a carrier salt, eg. an alkaline salt, is dissolved.

The electrolyte could also be constituted by liquid $SOCl_2$ or $SO_2$.

In a specific embodiment, the negative electrode is made from about 25 mg of the compound $K_{0.23}Ga$. This material is mixed with about 10 mg of a conductive compound constituted of graphite and acetylene black. To insert the lithium by electrochemical means, an electrode of the said material is immersed in dioxolane opposite to a lithium electrode which acts as a source of $Li^+$ ions. During the reduction process, lithium ions will progressively fill up the "molecular sponge" of $K_{0.23}Ga$ by progressively transferring charge from the polyanionic structure to the lithium ions.

This process is clearly shown up by electrochemically reducing the structure of the $K_{0.23}Ga$ during short periods (of about ten minutes each) and then allowing the potential to relax to an equilibrium value during the following ten minutes.

Figure 1:
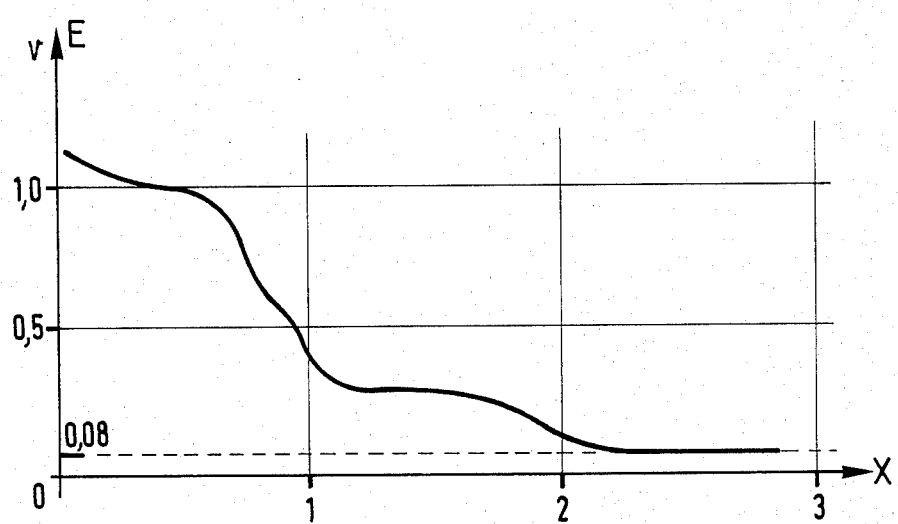
FIG. 1 is a graph of variation in the potential relative to lithium of a compound in accordance with the invention.

The FIG. 1 pseudo-equilibrium curve is then obtained, which curve shows up the various defined compounds which are formed and their free energy relative to lithium.

In the figure, the potential E of the $Li_xK_{0.23}Ga$ relative to lithium is plotted in volts up the Y-axis, and the lithium coefficient x is plotted along the X-axis.

Several distinct domains of electroactivity can then be defined:

(1) while $x \leq 0.8$, the free energy is close to 1.0 V relative to lithium. Given the voltage, this domain is of little practical interest;

(2) there is a narrow domain for $0.8 < x < 1.0$ in which the standard potential relative to lithium is close to 550 mV;

(3) there is a broad domain for $1 \leq x \leq 2$ characterized by solid phase unmixing. This domain has a potential of about 280 mV relative to lithium; and (4) there is a very broad domain for $2 \leq x \leq 4$ in which the potential is less than 80 mV.

As can be seen from this analysis, there exists a domain which is thermodynamically highly favorable to energy storage over the range $1 \leq x \leq 4$.

It is thus possible to estimate an upper value of capacity per unit mass of 1020 mAh/g as compared with the theoretical value of 990 for an aluminum electrode. In energy terms, and for 2 volts positive relative to a lithium electrode, that gives 1887 mWh/g for $K_{0.23}Ga$ as compared with a theoretical value of 1633 for an aluminum electrode.

Given that a LiAl electrode is capable of delivering only 40% of its theoretical efficiency during shallow cycling and only 25% during deep cycling, the reversibility of $Li_xK_{0.23}Ga$ compounds is of great interest.

To test this, a $Li_xK_{0.23}Ga$ electrode very similar to the one described above had 35 mAh of lithium inserted therein at 100 microamps, ie. by charging at a rate of C/350. After the system potential had stabilized, the system was recharged at 10 microamps.

Figure 2:
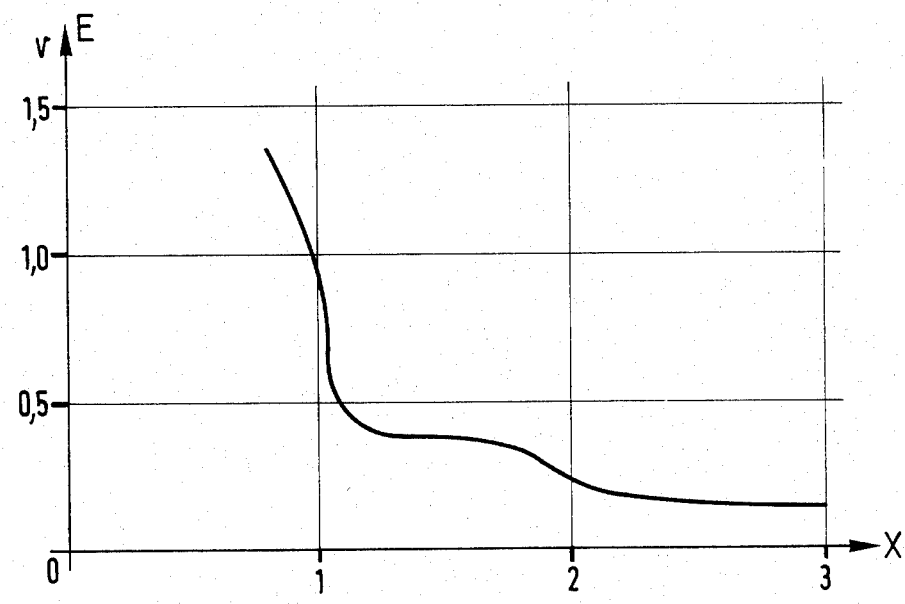
FIG. 2 is a similar graph to FIG. 1, but during charging.

The curve shown in FIG. 2 shows remarkable reversibility over the entire range $x > 1$, with the electrode being polarized by no more than 100 mV at a current of 10 microamps.

Reversibility tests over a large depth of discharge have been performed on electrodes made by the above method.

Thus, the electrode was discharged to 34 mAh (which corresponds approximately to the formula $Li_{4.5}K_{0.23}Ga$) at a current of 100 microamps. It was then charged by 7 mAh, with the electrode potential remaining around 150 mV over about 6 mAh. The system was then reduced to 45 mAh (corresponding approximately to the formula $Li_{5.8}K_{0.23}Ga$) and recharged to 26 mAh; the polarization while charging at 100 microamps was then 250 mV. The active mass was then reduced until lithium was deposited, ie. at 45 mAh. It was then possible to cycle 15 mAh without significant polarization in electrodeposition of lithium.

Figure 3:
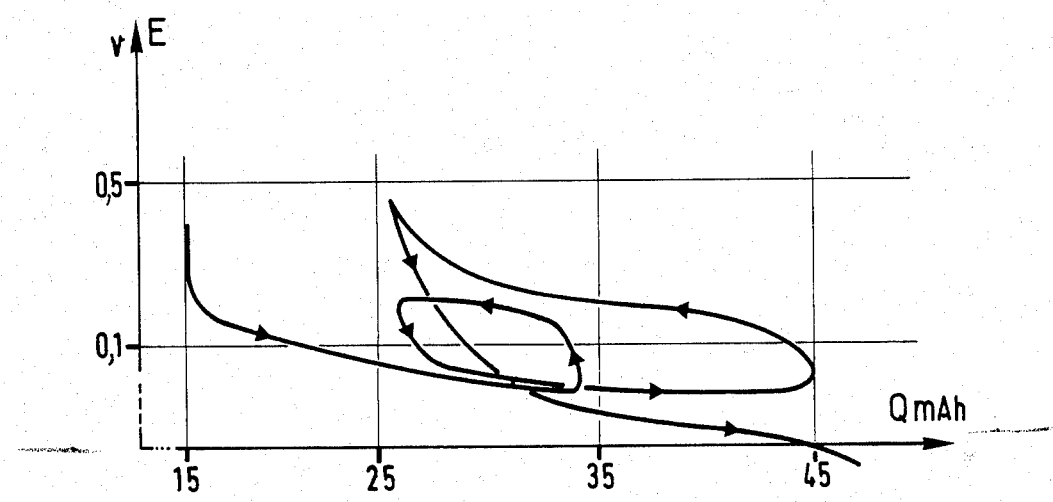
FIG. 3 is a graph of two charge-discharge cycles.

The results of these tests are shown in FIG. 3 where the number of mAh exchanged is plotted along the X-axis.

With the electrode prior charged up to 35 mAh, ten charge-discharge cycles were performed without significant ageing between $Li_2K_{0.23}Ga$ and $Li_4K_{0.23}Ga$. There were then two experimentally rechargeable equivalents, ie. a practical capacity per unit mass of 680 mAh/g at lithium potential as compared with a practical value of 430 at a potential of 350 mV for an electrode made of LiAl.

Figure 4:
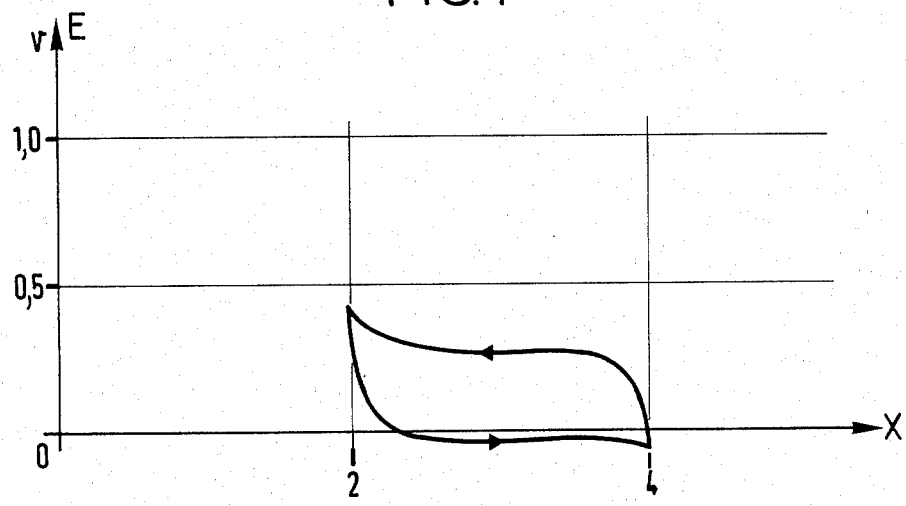
FIG. 4 is a graph of the tenth charge-discharge cycle.

The results of these tests are shown in FIG. 4.

The properties which give rise to $K_{0.23}Ga$'s good reversibility characteristics are thus:

its structure in the form of anionic clusters; and the metallic conduction properties of such a structure.

The important feature of such structures is that they contain channels into which the alkali atoms are inserted. These channels appear in a non-compact stacking of gallium polyhedra which are interconnected by direct bonds and by bonds passing via isolated low co-ordination gallium atoms which confer a degree of flexibility to the edifice, thereby facilitating the insertion of smaller alkali atoms (eg. lithium). Orthorhombic $K_3Ga_{13}$ has relatively low packing density (0.57) for an intermetallic compound, which is an advantage in a "host" structure; the rhombohedric lithium-deficient non-stoichiometric phase $Li_3Ga_{14}$ is even less compact (0.43).

Other structures of the same type have been found in boron-rich phases such as $NaB_{0.84}B_{14}$. Their low packing density (0.47) is close to that of gallium phases. In boron-rich phases, the boron sub-lattice has cavities which are big enough to receive sodium, magnesium, or aluminum atoms. All things considered, and even though such phases have low compactness, their cavities are smaller than those found in gallium-rich phases where interstitial atoms such as K, Rb, or Cs may be inserted.

The compound $Li_{0.21}Ga$ has also been tested.

The electrode potential drops very rapidly in this case to lithium potential once the current applied to 25 mg of electrode exceeds about ten microamps. The lithium thus electrodeposited on the cluster structure is thus rechargeable and it seems there is no lithium instability while it is trapped in such a structure. The charging efficiency during a first cycle charge at 100 microamps is then about 100%.

Good results have also been obtained with the compound $Rb_{0.14}Ga$ (ie. $RbGa_7$) in which the electrodeposited lithium is reversible as for $K_{0.23}Ga$.

Naturally the invention is not limited to the specific implementations described, which have been given by way of example.

We claim:

1. An electrode for a secondary electrochemical cell operating in a non-aqueous medium, wherein the active material is constituted by an alkali metal in the zero valent state which alkali metal is inserted into an insertion compound, the improvement wherein said insertion compound receiving said alkali metal has an ordered three-dimensional lattice structure and is constituted by at least one intermetallic compound having polyatomic anionic clusters with atoms chosen from the group constituted by gallium, boron and aluminum, and with structuring counter ions chosen from the group constituted by alkaline earth and alkali ions.

2. An electrode according to claim 1, having the formula $A_zM_yG$ where:

A is an alkali metal constituting the active material;

M is a structural akali metal or alkaline earth; and

G is chosen from gallium, boron and aluminum; where preferably $$0 \leq z \leq 6$$

$$0.05 \leq y \leq 2.$$

3. An electrode according to claim 2, wherein G is gallium, and M is chosen from Li, Na and K.

4. An electrode according to claim 3, wherein the intermetallic cluster compound has a formula chosen from the group constituted by:

$K_{0.23}Ga$, $Li_{0.21}Ga$, $Li_2Ga$, $Na_{0.25}Ga$, $Li_{1.5}Ga$, $Li_{1.25}Ga$, $Na_{0.56}Ga$.

5. An electrode according to claim 1, wherein the intermetallic cluster compound is heteroatomic.

6. An electrode according to claim 5, wherein the intermetallic cluster compound is based on boron and gallium.

7. An electrode according to claim 5, wherein the intermetallic cluster compound is based on aluminum and gallium.

8. An electrode according to claim 1, wherein the structural ions comprise a mixture of alkali ions and of alkaline earth ions.

9. A secondary electrochemical cell operating in a non-aqueous medium and including a positive electrode, an electrolyte, and a negative electrode as defined in claim 1.

10. A cell according to claim 9, wherein the positive electrode includes a compound chosen from the group constituted by:

$Li_zFeS_2$, $Li_zNiPS_3$, or $Li_zTiS_2$, where $0 < z < 4$; a compound such as $Li_yMnO_2$ where $y \leq 1$; sulfur; polysulfides; $SO_2$; and $SOCl_2$.

11. A cell according to claim 9, wherein the electrolyte comprises dioxolane including lithium perchlorate in solution.

12. A cell according to claim 9, wherein the electrolyte is a solid electrolyte based on polyoxyethylene with a carrier salt dissolved therein.

13. A cell according to claim 9, wherein the electrolyte is chosen from the group constituted by liquid $SOCl_2$ and $SO_2$.

14. A cell according to claim 9, wherein the electrolyte comprises a molten salt such as a mixture of alkaline chlorides.

* * * * *